(12) United States Patent
Ngo et al.

(10) Patent No.: US 9,020,887 B2
(45) Date of Patent: Apr. 28, 2015

(54) MANAGING THE STATUS OF DOCUMENTS IN A DISTRIBUTED STORAGE SYSTEM

(75) Inventors: John-Thomas Calderon Ngo, Draper, UT (US); James Todd Webb, Alpine, UT (US)

(73) Assignee: Proofpoint, Inc., Sunnyvale, CA (US)

( * ) Notice: Subject to any disclaimer, the term of this patent is extended or adjusted under 35 U.S.C. 154(b) by 1321 days.

(21) Appl. No.: 11/054,325

(22) Filed: Feb. 8, 2005

(65) Prior Publication Data

US 2006/0136513 A1    Jun. 22, 2006

Related U.S. Application Data

(63) Continuation-in-part of application No. 11/017,097, filed on Dec. 21, 2004, now Pat. No. 7,908,247.

(51) Int. Cl.
*G06F 17/30* (2006.01)
*G06F 17/22* (2006.01)
*G06Q 10/10* (2012.01)

(52) U.S. Cl.
CPC ...... *G06F 17/30011* (2013.01); *G06F 17/2288* (2013.01); *G06F 17/30165* (2013.01); *G06F 17/30174* (2013.01); *G06Q 10/10* (2013.01)

(58) Field of Classification Search
USPC .......................................... 707/10, 610, 638
See application file for complete search history.

(56) References Cited

U.S. PATENT DOCUMENTS

| | | | |
|---|---|---|---|
| 4,620,276 A | 10/1986 | Daniell et al. | |
| 4,853,843 A | 8/1989 | Ecklund | |
| 5,261,094 A | 11/1993 | Everson et al. | |
| 5,265,164 A | 11/1993 | Matyas et al. | |
| 5,588,147 A | 12/1996 | Neeman et al. | |
| 5,649,200 A | 7/1997 | Leblang et al. | |
| 5,684,984 A | 11/1997 | Jones et al. | |
| 5,692,187 A * | 11/1997 | Goldman et al. | 707/203 |
| 5,734,852 A | 3/1998 | Zias et al. | |
| 5,737,601 A | 4/1998 | Jain et al. | |
| 5,737,738 A | 4/1998 | Sharman | |
| 5,745,753 A | 4/1998 | Mosher, Jr. | |
| 5,757,669 A | 5/1998 | Christie et al. | |
| 5,771,355 A | 6/1998 | Kuzma | |
| 5,781,912 A | 7/1998 | Demers et al. | |
| 5,787,247 A | 7/1998 | Norin et al. | |
| 5,787,442 A | 7/1998 | Hacherl et al. | |
| 5,794,253 A | 8/1998 | Norin et al. | |
| 5,799,306 A | 8/1998 | Sun et al. | |

(Continued)

FOREIGN PATENT DOCUMENTS

EP    0770963 A3    5/1997

OTHER PUBLICATIONS

M. David Stone, Get Files Back Without the Merge Question, May 6, 2003, http://www.pcmag.com/article2/0.1759.1027570.00.asp.

(Continued)

*Primary Examiner* — Kim Nguyen
(74) *Attorney, Agent, or Firm* — Van Pelt, Yi & James LLP

(57) ABSTRACT

Managing the status of documents in a distributed storage system is disclosed. Upon determining that a first version exists and a second version having a predecessor version identifier exists, the predecessor version identifier is used to determine that the second version is related to the first version. Based upon the existence of the related second version, the status of the first version is updated.

39 Claims, 6 Drawing Sheets

(56) References Cited

U.S. PATENT DOCUMENTS

| | | | |
|---|---|---|---|
| 5,806,075 A | | 9/1998 | Jain et al. |
| 5,806,078 A | * | 9/1998 | Hug et al. ............... 715/511 |
| 5,812,793 A | | 9/1998 | Shakib et al. |
| 5,819,272 A | | 10/1998 | Benson |
| 5,819,306 A | * | 10/1998 | Goldman et al. ........... 711/100 |
| 5,832,225 A | | 11/1998 | Hacherl et al. |
| 5,832,514 A | | 11/1998 | Norin et al. |
| 5,838,921 A | | 11/1998 | Speeter |
| 5,857,207 A | * | 1/1999 | Lo et al. ............... 707/203 |
| 5,859,790 A | | 1/1999 | Sidwell |
| 5,870,764 A | * | 2/1999 | Lo et al. ............... 707/203 |
| 5,884,324 A | | 3/1999 | Cheng et al. |
| 5,937,414 A | | 8/1999 | Souder et al. |
| 5,946,689 A | | 8/1999 | Yanaka et al. |
| 5,950,198 A | | 9/1999 | Falls et al. |
| 5,956,489 A | | 9/1999 | San Andres et al. |
| 5,960,460 A | | 9/1999 | Marasco et al. |
| 5,991,768 A | | 11/1999 | Sun et al. |
| 5,995,980 A | | 11/1999 | Olsen et al. |
| 6,049,809 A | | 4/2000 | Raman et al. |
| 6,058,401 A | | 5/2000 | Stamos et al. |
| 6,067,551 A | | 5/2000 | Brown et al. |
| 6,088,721 A | | 7/2000 | Lin et al. |
| 6,122,630 A | | 9/2000 | Strickler et al. |
| 6,138,124 A | | 10/2000 | Beckhardt |
| 6,144,999 A | | 11/2000 | Khalidi et al. |
| 6,167,427 A | | 12/2000 | Rabinovich et al. |
| 6,167,437 A | | 12/2000 | Stevens et al. |
| 6,167,438 A | | 12/2000 | Yates et al. |
| 6,182,117 B1 | | 1/2001 | Christie et al. |
| 6,199,082 B1 | | 3/2001 | Ferrel et al. |
| 6,253,211 B1 | | 6/2001 | Gillies et al. |
| 6,301,589 B1 | | 10/2001 | Hirashima et al. |
| 6,304,882 B1 | | 10/2001 | Strellis et al. |
| 6,341,291 B1 | | 1/2002 | Bentley et al. |
| 6,615,223 B1 | | 9/2003 | Shih et al. |
| 6,918,082 B1 | | 7/2005 | Gross et al. |
| 2001/0037398 A1 | | 11/2001 | Chao et al. |
| 2002/0129045 A1 | | 9/2002 | Aoyama et al. |
| 2002/0138447 A1 | | 9/2002 | Dutta |
| 2003/0050886 A1 | | 3/2003 | Cohen et al. |
| 2003/0126391 A1 | | 7/2003 | Neufeld et al. |
| 2003/0130882 A1 | | 7/2003 | Shuttleworth et al. |
| 2003/0145020 A1 | | 7/2003 | Ngo et al. |
| 2003/0200235 A1 | | 10/2003 | Choy et al. |
| 2004/0034670 A1 | | 2/2004 | Bhuyan |
| 2006/0101092 A1 | | 5/2006 | Ishida et al. |

OTHER PUBLICATIONS

Foldershare, File Transfer & Remote File Access, 2005, https://www.foldershare.com/info/aboutFoldershare.php?.

Shinkuro, Inc., Tools for Collaboration, http://www.shinkuro.com/products.php.

Groove Networks, Virtual Office File Sharing, http://www.groove.net/index.cfm/pagename/hp_filesharing/.

Gregory Shultz, Using Briefcase to Keep Files Synchronized, Aug. 2000, http://www.msdn.microsoft.com/library/default.asp?url=/library/enus/dnwinpro00/html/w9p0085.asp.

EMC, Content Management, Content Server, http://www.documentum.com/products/glossary/content_server.htm?uq=False&printReady=True.

Interwoven, Collaborative Document Management, http://www.imanage.com/products/document_management/index.html.

EMC, Documentum eRoom, Collaborative Solutions that Allow People to Work the Way They Work Best, http://www.documentum.com/products/dctm_eroom.htm.

IBM Software, IBM Lotus Team Workplace (QuickPlace), http://www.lotus.com/products/product3.nsf/wdocs/ltwhome.

Interwoven, Interwoven WorkTeam™, Mobilize your teams through collaborative work spaces, http://www.interwoven.com/products/worksite/workteam.html.

Microsoft, Microsoft Office Assistant, Administration of Shared Workbooks, http://office.microsoft.com/en-us/assistance/HA010130571033.aspx.

HUMMINGBIRD™, Hummingbird DOCS Open Data Sheet.

NEXTpage, Project Chrome, Feb. 2004.

Per Cederqvist et al., User Manual for CVS 1.11.3, 1993.

Product Backgrounder for Groove Desktop Collaboration Software, Jan. 2003, selected pages from User's Guide relating to Shared Spaces and Synchronization.

* cited by examiner understanding of the invention. These details are provided for the
MANAGING THE STATUS OF DOCUMENTS IN A DISTRIBUTED STORAGE SYSTEM

CROSS REFERENCE TO OTHER APPLICATIONS

Co-pending U.S. patent application Ser. No. 10/059,233, issued as U.S. Pat. No. 7,024,429, entitled "Data Replication Based upon a Non-Destructive Data Model" filed Jan. 31, 2002 is incorporated herein by reference for all purposes.

This application is a continuation in part of U.S. patent application Ser. No. 11/017,097, issued as U.S. Pat. No. 7,908,247, entitled "Storage- and Transport-Independent Collaborative Document-Management System," filed Dec. 21, 2004, which is incorporated herein by reference for all purposes.

FIELD OF THE INVENTION

The present invention relates generally to document management systems. More specifically, managing the status of documents in a distributed storage system is disclosed.

BACKGROUND OF THE INVENTION

The collaborative authoring of documents has become ubiquitous in organizations with control over documents available to a variety of different users. Document management systems are employed to manage and track the various versions of documents as they are collaboratively created by possibly different users in an organization. Existing document management systems work well for centralized storage, allowing users to access and/or modify documents as necessary from a central repository, such as a shared network drive or a web-based team room. However, distributed storage naturally results as versions are created, modified, and/or transferred on different media by users on remote and/or local hosts in a network.

Thus, a need exists for updating and otherwise managing the status of distributively stored versions of documents.

BRIEF DESCRIPTION OF THE DRAWINGS

Various embodiments of the invention are disclosed in the following detailed description and the accompanying drawings.

DETAILED DESCRIPTION

Figure 1:
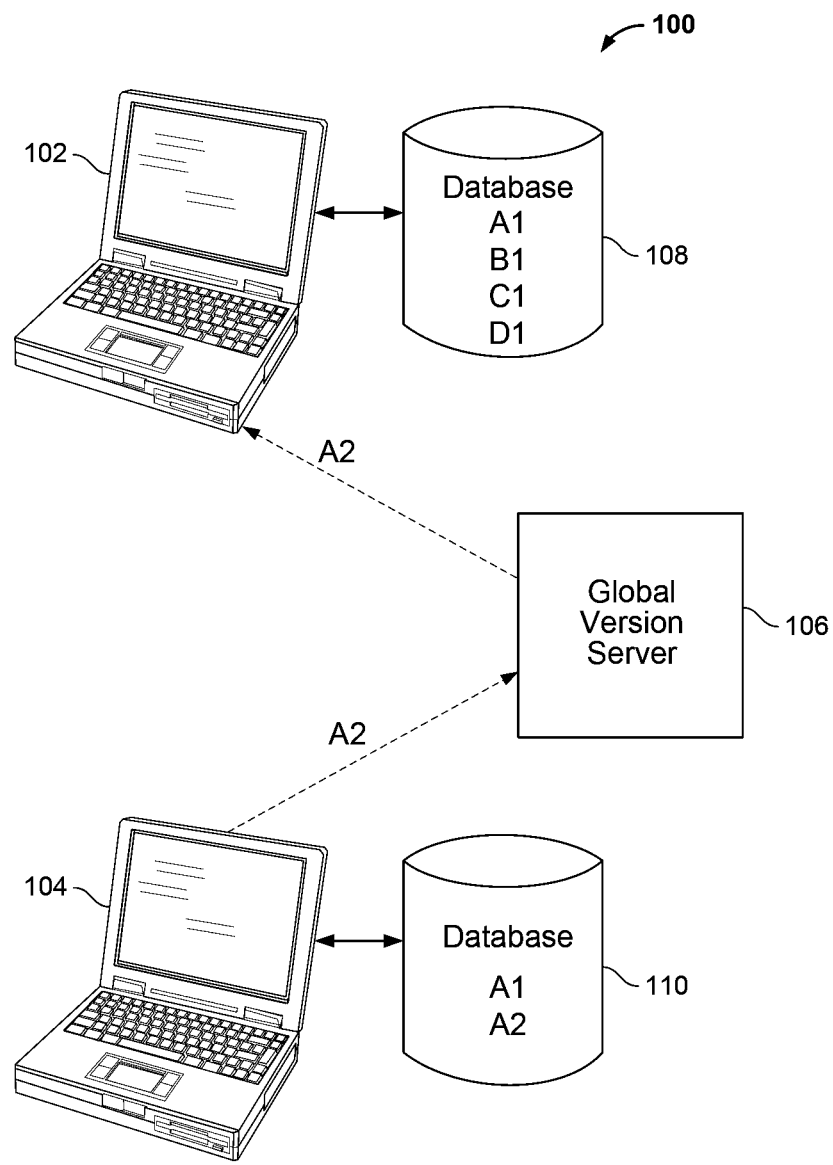
FIG. 1 illustrates an embodiment of a network environment where versions of documents are distributively stored.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing the status of documents in a distributed storage system is disclosed. In some embodiments, a document management system attaches to each version of a document a unique version identifier. In addition, an individual version history that includes the version identifiers of predecessor versions travels with the file associated with each document or version. The version identifier and individual version history are utilized by the document management system to determine relationships among various versions, which may possibly be created by different users in a network and locally stored on one or more devices in the network. In some embodiments, the document management system provides centralized version control by maintaining on a server a version history that records the status, relationships, and/or locations of documents and versions that are distributively stored on devices within a network.

In the context of the discussion hereinafter, a "document" comprises any set of data that can be created and/or edited by a group of users and stored in a tangible form. Examples of documents include an article created with a word processor, a slide presentation, a spreadsheet, a drawing created with a CAD or paint application, a software program, etc. A "document version" or simply "version" denotes the state of a document at some point during its creation. A document, therefore, may be regarded as a series of related versions. A version is identified by a unique version identifier. In some embodiments, a document is identified by a unique document identifier.

In some embodiments, the comprehensive management of document versions in a distributed network is facilitated by a document management system that includes a global version server and client components of the document management system installed on each device in the network. The term "global" is used herein to reflect that the global version server is accessible to a plurality of devices within a network. The term "global" does not necessarily signify that the devices are located in a plurality of geographical locations. In some embodiments, a device is a host in the network. The global version server maintains a global version history of documents in the network which records the relationships of the various versions in the network. The global version server communicates with the client components on the hosts to update the global version history and provide the hosts with desired versions and/or information pertaining to the relationships and/or locations of versions. In a distributed storage system, various versions are generated and stored on individual hosts in the network. In some embodiments, the global version server may also provide centralized storage for some or all of the versions, e.g., the global version server may include a shared network drive, provide backup functionality for remotely stored document versions, etc.

The client component of the document management system provides custom document management support for each individual host at all times, even when the host is offline, and communicates with the global version server when the host is online. Specifically, the client maintains a record of the document files that are in storage on the host. This may include all storage media, or only a designated volume or folder. In some embodiments, the client registers with the host's file system to receive notification every time a file is written to any media within the file system. Each time such an event occurs, the client can add or update an entry in a table to record information pertinent to the file management process. In some embodiments, the client assigns a unique version identifier (VID) to each version created and/or edited on a given host and maintains a local version history of the relationships of document versions stored at the host. In some embodiments, the VID assigned to each new version is appended to an individual version history that includes predecessor version identifiers that are associated with each file. If the version is the original version, the VID assigned to the version is the only entry in the individual version history. When a host is online, the client at the host receives information of relevant updates in the global version history from the global version server and communicates any changes in the local version history at the host to the global version server.

FIG. 1 illustrates an embodiment of a network environment 100 where document versions are distributively stored. The existence of a new version at a host is communicated to a global version server which, in turn, communicates the updated version and/or a notification of the existence of an updated version to other interested hosts in the network. In the example of FIG. 1, hosts 102 and 104 are depicted as laptops to signify that they may possibly be remote hosts in the network that may not be online and in communication with other hosts in the network at all times. In some embodiments, either or both of hosts 102 and 104 may be fixed nodes in the network that are in communication with other hosts in the network at all times. The management of documents and versions in network environment 100 is facilitated by a document management system that includes a global version server 106 and client components of the document management system installed on each host in the network. Global version server 106 maintains a global version history of documents in the network and information about the relationships and/or locations of versions on hosts within the network. Document management in the network is achieved by the interaction between the client components on the hosts and the global version server such that the global version history is up to date with respect to all online hosts. In some embodiments, upon updating the global version history, the global version server communicates changes in the global version history to interested hosts in the network.

In the example of FIG. 1, clients on hosts 102 and 104 maintain local version histories via databases 108 and 110, respectively. Specifically, database 108 of host 102 contains versions A1, B1, C1, and D1 while database 110 of host 104 contains versions A1 and A2, e.g., two versions of Document A. In this example, a user of host 104 creates A2, a newer version of Document A, and communicates the change in status of Document A to global version server 106. When creating a newer version, the user of host 104 may create the newer version based on version A1, which is already available at the host. However, if host 104 is online, the client on host 104 may request the latest version history of Document A from global version server 106. If any newer versions exist on other hosts in the network, the user is made aware of the existence of these newer versions and may obtain one or more of these versions prior to the creation of a newer version.

In some embodiments, the change in status of Document A is communicated by the client on host 104 to global version server 106 in real time in the event that host 104 is online when version A2 is created. Alternatively, version A2 may be created on host 104 during an offline period, and the change in status of Document A at host 104 is communicated by the client on host 104 to global version server 106 the next time host 104 is online. The global version history is updated by global version server 106 upon knowledge of the existence of a newer version. A notification of the existence and/or a copy of the most recent version of Document A may subsequently be communicated to other interested hosts in the network by the global version server. As illustrated in FIG. 1, a copy of the newer version of Document A, A2, is transmitted by global version server 106 to host 102, which already possesses A1, the previous latest version of Document A.

Figure 2A:
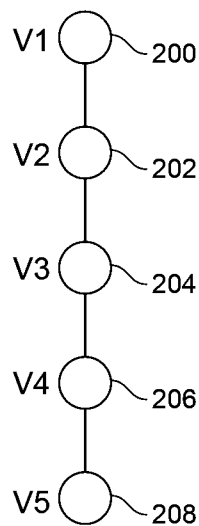
FIG. 2A illustrates an embodiment of a graph of a version history.

FIG. 2A illustrates an embodiment of a graph of a version history. In this example, an original version, V1 (200), is initially created by a user at a host. Subsequently, the user may edit the original version and save the edits, thereby producing a second version, V2 (202). Each time the user edits a version and then saves those edits, another new version V3 (204), V4 (206), V5 (208) is created. In the example of FIG. 2A, each version is directly derived from the chronologically preceding version. The various versions V1-V5 (200-208) illustrated in FIG. 2A may all be made by a single user, or could be made by multiple users in succession. For example, User A may create and save the original version V1 (200) and then email it to User B for review. User B can edit and save the document, which produces the second version V2 (202), and then email this version to User C, whose edits would be saved as version V3 (204). Eventually, the version V3 may find its way back to the original User A, whose further edits are saved as version V4 (206) and the latest version V5 (208).

In some embodiments, when a user edits a version and then saves the edits, the new version overwrites the previous version, unless the user manually performs an action to designate the saved edits as a new version. In some embodiments, information pertaining to each prior version (e.g. V1-V4 (200-206) of FIG. 2A) is persistently maintained, and separately identified. One example of the manner in which the information can be maintained is described in "Data Replication Based upon a Non-Destructive Data Model", which was previously incorporated by reference.

In some embodiments, a new version is created every time a document is saved to any form of persistent storage. Thus, multiple versions can be created during a single user session of working on a document. This embodiment is desirable when the possibility exists that another user could copy an intermediate version of the document at any time and edit it. By establishing a new version with each save, consistency among different users' versions is more likely to occur in such a situation. In alternative embodiments, a new version can be created only when the document is closed by the user performing the edits.

The status of a version can be updated in one or more ways upon the creation of a new version. A version may be edited and/or modified to create a new version. If a version is considered to be obsolete, the version may be replaced or overwritten by a new version. In such instances, the overwriting version is updated with the version identifier that would have resulted had the user created it by opening the replaced version and saving it. In some embodiments, even though a version has been edited, the version is maintained, and the new version is saved as a separate version that is related to the edited version. A version may be merged with one or more versions to create a new version. In such a case, the versions that are merged may be maintained as individual versions as well.

In order to uniquely identify each version, a version identifier (VID) is attached by the client on a host to each version that is created at the host. The version identifier is a globally unique identifier and can be generated according to any suitable algorithm for generating values that are guaranteed to be globally unique. In some embodiments, the VID identifies the relative chronological position of each version when a series of related versions exist. The file associated with each version contains an individual version history that includes predecessor version identifiers, and the VID assigned to the version is appended to this version history. In FIG. 2A, for example, since V1 (200) and V2 (202) precede V3 (204), the file associated with V3 (204) contains the VIDs of VI (200) and V2 (202) in the individual version history in addition to the VID assigned to V3 (204). Such an individual version history enables the client component of the document management system to relate the version to other versions that are already stored at the host. Similarly, the individual version history allows the global version server to identify the relationship of a specific version to other versions in the global version history.

The VID and predecessor VIDs of a version travel with the file associated with the version as it is transmitted from one user to another or saved on different media. The VID(s) may be directly embedded into a file as metadata, such as by means of stamping. As an alternative to incorporating the metadata directly into the file, it is possible to store the metadata containing the VID(s) in a separate file that travels with, and remains associated with, the file of a given version. In alternative embodiments, the metadata containing the VID(s) may be stored within a separate data stream that remains permanently associated with the file of a given version.

Figure 2B:
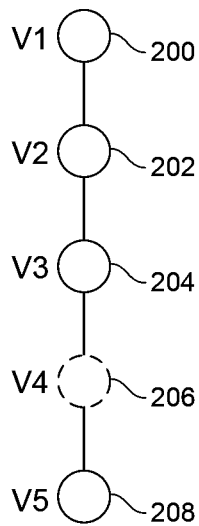
FIG. 2B illustrates an embodiment in which a client utilizes the individual version history of a received version to relate it to other related versions that already exist on a host.

FIG. 2B illustrates an embodiment in which the client utilizes the individual version history of a received version to relate it to other related versions that already exist on the host. In one example, versions V1 (200), V2 (202), and V3 (204) already exist on a host, and the host subsequently receives a related version V5 (208), e.g., from another host in the network. The client on the host will recognize received version V5 (208) as related to versions V1 (200), V2 (202), and V3 (204), since the individual version history associated with the file of version V5 (208) contains predecessor VIDs associated with V1 (200), V2 (202), and V3 (204). The individual version history of V5 (208) also includes a predecessor VID for V4 (206). The client at the host recognizes the existence of version V4 (206) although it is not locally stored at the host. It infers that version V4 (206) succeeds version V3 (204) already stored at the host and precedes version V5 (208) received at the host. Thus, V4 (206) may be incorporated into the local version history at the host. In FIG. 2B, V4 (206) is accordingly depicted as a dotted node in the version history to indicate that it is not locally stored at the host, but exists at one or more other hosts in the network.

Figure 3A:
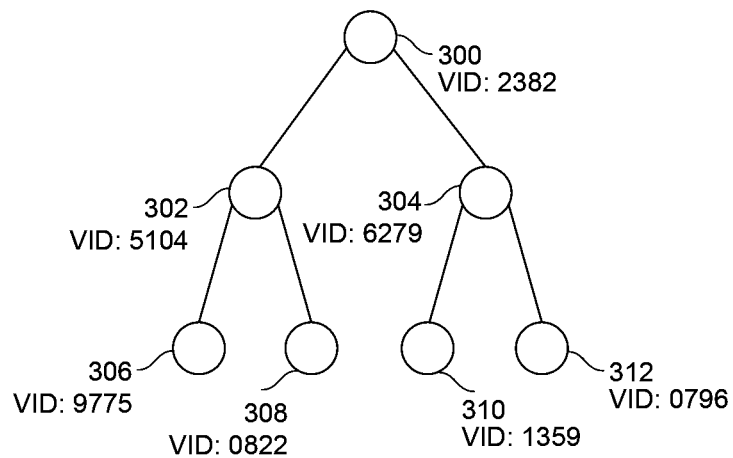
FIG. 3A illustrates an embodiment of a graph of a version history in which branching occurs.

FIG. 3A illustrates an embodiment of a graph of a version history in which branching occurs, e.g., multiple versions are derived from the same predecessor version. In various user situations, versions 300-312 may be created at the same host or at different hosts in the network. The version history may be constructed by the global version server as part of the global version history and/or by a client component of the document management system as part of a local version history at a host. In some embodiments, the original version, such as version 300, is the original version of a new document. When such a version is created at a host, the client assigns to the version a unique VID, e.g., 2382 for version 300 as depicted in FIG. 3A. The file associated with the original version does not contain any predecessor version identifiers since the version is not derived from any other version or document. In alternative embodiments, a version may be derived from a pre-existing version or document, but the user may choose to save the version as an original version, which clears the version history associated with the file and substitutes a new, unrelated version history. Upon creation of new version 300, the client on the host at which version 300 is created notifies the global version server of the existence of version 300 either in real time if the host is online or the next time the host is online if the host is offline when version 300 is created.

In one example of the formation of a version history, the user who created version 300 at one host, Host A, may email a copy of version 300 to another host, Host B, for further review. The user at Host A may make further edits to version 300, which produces version 302. The individual version history associated with the file of version 302 contains the predecessor VID of version 300 (2382). The client on Host A assigns a unique VID (5104) to version 302 and notifies the global version server of the existence of version 302 at Host A. Similarly, a user of Host B may make edits to received version 300 to produce version 304. The individual version history associated with the file of version 304 contains the predecessor VID of version 300 (2382). The client on Host B assigns a unique VID (6279) to version 304 and notifies the global version server of the existence of version 304 at Host B. The local version history at Host A includes versions 300 and 302 while the local version history at Host B includes versions 300 and 304. However, the global version history at the global version server, includes versions 300, 302, and 304 since the global version server maintains an up to date record of the relationships of document versions within the entire network with respect to all online hosts. The clients at Hosts A and/or B may receive updates in the global version history from the global version server, and, thus, the local version histories at the hosts may include all related versions, e.g., versions 300, 302, and 304 in FIG. 3A.

Further branching of the version history may occur as depicted in FIG. 3A, if, for instance, Host A sends the most recent version at Host A, version 302, to other hosts, such as Host C and Host D. Users at Hosts C and D may edit received version 302 to create versions 306 and 308, respectively. The individual version histories associated with the files of versions 306 and 308 contain predecessor VIDs of versions 302 and 300 (5104 and 2382, respectively). The clients on Hosts C and D assign to versions 306 and 308 unique VIDs, 9775 and 0822, respectively, and notify the global version server of the existence of these newer versions. The local version history at Host C includes versions 300, 302 and 306 while the local version history at Host D includes versions 300, 302, and 308.

Similarly, Host B may send the most recent version at Host B, version 304, to other hosts, such as Host E and Host F. Users at Hosts E and F may edit version 304 to create versions 310 and 312, respectively. The individual version histories associated with the files of versions 310 and 312 contain predecessor VIDs of versions 304 and 300 (6279 and 2382, respectively). The clients on Hosts E and F assign to versions 310 and 312 unique VIDs, 1359 and 0796, respectively, and notify the global version server of the existence of these newer versions. The local version history at Host E includes versions 300, 304, and 310 while the local version history at Host F includes versions 300, 304, and 312. The global version history at global version server records the relationships of all versions 300-312 as depicted in FIG. 3A. In some embodiments, if updates in the global version history are received at some or all of the hosts (A-F) from the global version server, the hosts may contain some or all of the records and/or copies of versions 300-312.

Figure 3B:
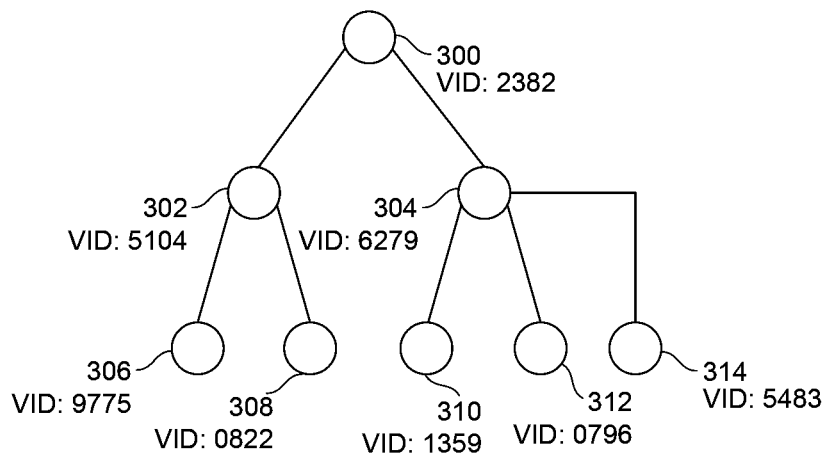
FIG. 3B illustrates an embodiment of a graph of a version history in which a new related version is created, and the global version server grafts the new version into the global version history.

FIG. 3B illustrates an embodiment of a graph of a version history in which a new related version is created, and the global version server grafts the new version into the global version history. The graph of the version history illustrated in FIG. 3B may be a part of the local version history at a host, and the client at the host may graft the new version into the local version history. With respect to the example discussed in relation to FIG. 3A, Host B sends the most recent version at Host B, version 304, to an additional host, Host G, and the user at Host G edits version 304 to create a new version, version 314, which is assigned a unique VID, 5483, by the client on Host G. The individual version history associated with the file of version 314 contains predecessor VIDs of versions 304 and 300 (6279 and 2382, respectively). When the global version server is made aware of the new version 314 by the client on Host G, the global version server examines the individual version history associated with the new version and attempts to find a match in the global version history with the earliest predecessor VID in the individual version history associated with version 314. Thus, the global version server determines if a record of a version with VID 2382 (the VID of version 300) exists in the global version history. It then examines the individual version history associated with the new version and attempts to find a match in the global version history with the next predecessor VID, in this case, the VID 6279 (the VID of version 304). Having found the last such match, the global version server infers that the new version 314 with VID 5483 is a child of version 304 and updates the global version history by grafting a node that branches from version 304, as depicted in FIG. 3B. In some embodiments, the efficiency of this matching procedure can be improved by indexing techniques well known in the art, such as those found in commercially available databases.

For each new version or document created at a host, the client component of the document management system assigns a unique VID to the file associated with the version. In some embodiments, the client may also provisionally assign a document identifier and/or sequence number to the new version. If the new version is the original version, the new version does not have any predecessor versions, and the local version history at the host is updated by the client by merely recording the existence of the original version without having to determine any relationships that may exist with other versions or documents at the host. With respect to the representational graph of the version history depicted in FIG. 3A, the client adds to the local version history a free node, e.g., a node that does not branch from any other node, when an original version is created. If a new version is formed by modifying or editing a pre-existing version, the file associated with the new version contains from the file that was modified or edited the individual version history of predecessor versions. In such an instance, the client must take into account the possible relationships of the new version with other versions at the host when updating the local version history. With respect to the representational graph of the version history depicted in FIG. 3A, for a version that is not the original version, the client grafts a node to represent the new version that branches from the node of the version that was modified or edited to create the new version.

The individual version history associated with each file is arranged in a sequential order. For example, in some embodiments, the last VID in the list of predecessor VIDs in the individual version history is associated with the most recent version prior to the creation of the newer version, i.e., the version that was directly modified to create the newer version. In some embodiments, the VID assigned by the client to a new version is appended to the end of the individual version history. Since the VIDs assigned to the versions are globally unique, the relationship of a given version to other document versions at the host and/or in the network can be determined by examining the individual version history associated with that version. For example, if a host receives a version from another host in the network, the client at the host must determine whether the received version exists on the host and/or is related to other versions at the host in order to maintain an up to date local version history. If the version does not already exist at the host, e.g., no document version on the host exists with the same VID, the client proceeds to determine whether the version is related to any other version at the host if the individual version history of the received version contains one or more predecessor versions. If the version is an original version, the client records the existence of the version in the local version history.

In order to find a relationship for a received version with other versions at a host, the client considers the first predecessor VID (the VID of the earliest predecessor version to which the current version is related) in the individual version history associated with the received version to determine if a version with a matching predecessor VID exists at the host. If a match is found, the client compares the second predecessor VID of each file, and so on. The client determines that the last such match is the most recent common ancestor and updates the local version history accordingly. If no match is found and the predecessor VID list has been exhausted, the client concludes that none of the predecessor versions of the received version exist on the host. In some embodiments, the efficiency of this matching procedure can be improved by indexing techniques well known in the art, such as those found in commercially available databases.

When recording the existence of the received version in the local version history, the client can infer the existence and relationships of the predecessor versions and make the knowledge of the lineage of the received version available at the local version history at the host even though the predecessor versions are not locally stored at the host. Likewise, if the client finds a version at the host that has a VID that matches a predecessor VID somewhere in the list of predecessor VIDs associated with the individual version history of a received version, the client may infer the existence and relationships of predecessor versions whose VIDs were not found to match with the VIDs of versions on the host, and records of these versions may also be included by the client in the local version history.

In some embodiments, the process of matching the predecessor VIDs with the VIDs of versions at a host can be simplified by taking the document identifier of a received version into consideration. The document identifier is used to identify with which document, or group of related versions, the received version is associated. The client can limit the search to only those versions at the host that have the same document identifier and/or to versions with different document identifiers but that are related to versions with a document identifier that is the same as that of the received version. Once the client identifies one or more groups of related versions (with one or more different document identifiers) that the received version is possibly related to, the client utilizes the individual version history of the received version to determine the exact relationship of the received version with respect to the identified group(s) of related versions. In addition, in some embodiments the storage required to record predecessor VIDs within a file can be reduced by substituting a document identifier and range of sequence numbers for a subsequence of the predecessor VIDs. This compressed representation of the individual version history can be used for any VID that corresponds uniquely to a particular document identifier and sequence number. The global version server assigns this correspondence, as described in "Storage- and Transport-Independent Collaborative Document-Management System," which was previously incorporated by reference.

Like VIDs, document identifiers are globally unique identifiers that may be assigned in various manners. In some embodiments, each version is assigned a document identifier that identifies the document of which it is a version. Thus, each version that is a part of the same document is assigned the same document identifier. In some embodiments, each version is associated with a sequence number, which is an integer that is incremented each time a new version is created. Consequently, even though each version of a document is assigned the same document identifier, the sequence number is unique within that document and may indicate the relative position of the version in the group of versions that comprise the document. An extensive description of the manner in which document identifiers are assigned to each document is given in "Storage- and Transport-Independent Collaborative Document-Management System," which was previously incorporated by reference.

Versions of documents are typically stored and transferred as computer files. During the course of its existence, a file may undergo one or more renames (i.e. the filename may be changed), or a file may be moved. Despite changes to its filename and/or location, a version remains uniquely identified by its VID. For example, even if multiple copies of a single document, such as at various hosts in a network, are renamed, the files associated with the various copies have the same VID and same predecessor VIDs as long as no changes or modifications are made to the copies.

Similarly, a document or version that is moved out of (e.g. on removable storage media) and back into a network which employs such a document management system may also be identified by the VID(s) associated with the document or version prior to the move when it is reintroduced into the network. Thus, since the unique VID and the predecessor VIDs are permanently or persistently affixed to a version, the relationship of a version with respect to other versions and documents may always be determined even if the version is renamed, moved, merged, etc.

When a new document version is created at a host, the client component of the document management system communicates the existence of the new version to the global version server so that the global version history remains up to date. Each time a new document version is created at a host, the client on the host sends identifying information associated with the file of the version, e.g., the filename, document identifier (which may be provisional), VID, individual version history, etc., to the global version server. In some embodiments, the client may also send the actual file of the new version to the global version server, e.g. for back up storage, centralized storage, etc. In either case, the global version server utilizes some or all of the identifying information associated with a version to match the version to a position in the portion of the global version history associated with related versions if the version is not the original version. If the version is the original version, the version does not have an individual version history, and the global version server represents the version as an individual node that is not related to any other documents or versions that are recorded in the global version history.

If the version is not the original version, the global version server uses the individual version history and/or the document identifier and sequence number associated with the version to determine the relative position of the version in the global version history in a manner similar to that described in relation to the manner in which a client determines the relative position of a version within the local version history at a host as was described above. Specifically, the global version server attempts to match the predecessor VIDs in the individual version history to VIDs in the global version history to determine if a possible relationship between the version and other documents in the network exists. The document identifier may be used to limit the search to one or more groups of related versions as previously described with respect to the client. In some embodiments, the matching of the VIDs and/or document identifier and sequence number can be achieved by employing indexing techniques well known in the art, such as those found in commercially available databases.

In addition, the global version server may infer the existence and relationships of predecessor versions from the individual version history of a version even if the existence of one or more predecessor versions was not individually communicated to the global version server prior to the receipt of the current version. For instance, a user of a host may create several versions while the host is offline. When online, the client at the host may simply communicate the existence of the most recent version, but from the individual version history of the most recent version, the global version server can infer the existence and relationships of predecessor versions and make a record of these versions in the global version history even though the existence of some or all of these predecessor version is never individually communicated to the global version server.

Alternatively, the client at a host may request the global version server for the current global version history or a portion thereof that corresponds to one or more groups of related versions that are related to a new version created at the host. The client determines the position of the new version relative to the received global version history and notifies the global version server of the relationship of the new version to other related versions in the global version history. Thus, the matching of a new version to other versions that exist in a network can be performed either at a client at a host or at the global version server. If a host is offline when new versions are created at the host, matching is performed by the client and/or the global version server the next time the host is online.

The client at a host can determine which versions have not been sent and accepted by the global version server by determining the versions in the local version history that have not been ratified (ratification is described in further detail in "Storage- and Transport-Independent Collaborative Document-Management System," which was previously incorporated by reference). The status of a version may change in one or more ways after being accepted into the global version history by the global version server, e.g., if the global version server assigns a different document identifier and/or sequence number to the version than was provisionally assigned by the client, etc. Upon updating the global version history with information about the new version, the global version server may confirm the status of the new version with the client at the host at which the new version was created.

Figure 4:
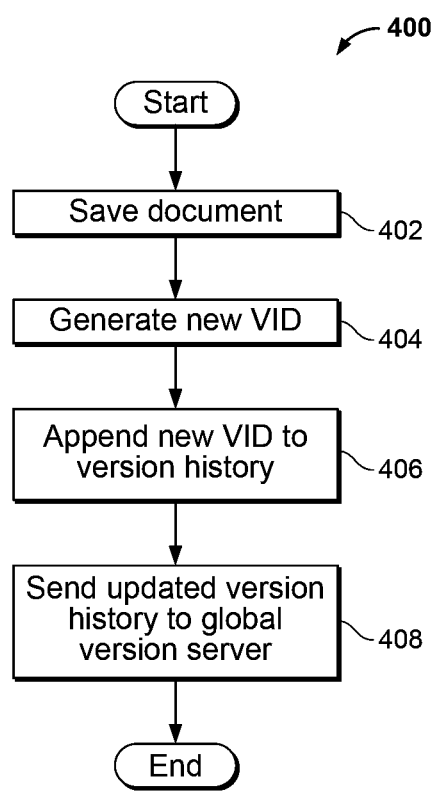
FIG. 4 illustrates an embodiment of a process that a client component of a document management system may perform when a new version is created at a host.

FIG. 4 illustrates an embodiment of a process that a client component of a document management system may perform when a new version is created at a host. Process 400 starts at 402 in which a user of the host saves a document or version. In this example, a new version is created each time a document or version is saved. In some embodiments, a new version is created only if the user desires to save it as a new version, e.g., by invoking a command such as "Save As." A save at 402 results in the generation of a unique VID at 404 by the client at the host to identify the new version saved at 402. At 406, the client appends the new VID to the version history associated with the file of the new version. At 408, the client sends the updated version history to the global version server. In some embodiments, the updated version history at 408 is the local version history at the host and/or the portion of the local version history that is affected by the creation of the new version. For example, if the document identifier is used in the identification of a group of related versions, the portion of the updated local version history corresponding to that document identifier and/or to related document identifiers may be sent to the global version server in 408. In alternative embodiments, the client sends the updated individual version history of the new version to the global version server at 408. Process 400 ends with 408.

Figure 5:
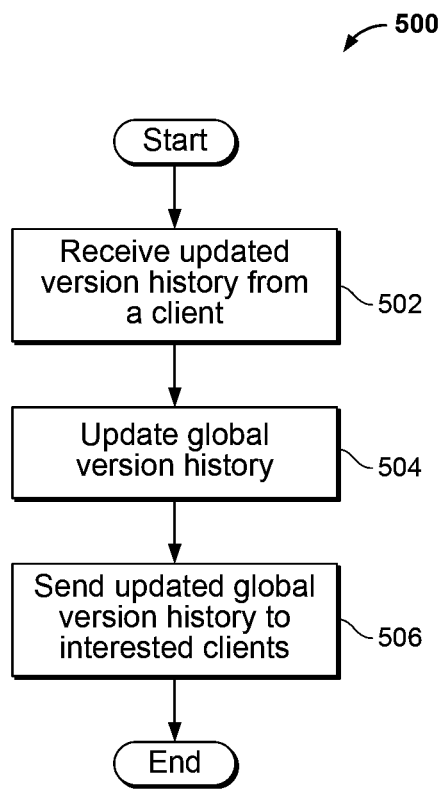
FIG. 5 illustrates an embodiment of a process that the global version server may perform upon learning of the existence of a new version at a host in the network.

FIG. 5 illustrates an embodiment of a process that the global version server may perform upon learning of the existence of a new version at a host in the network. Process 500 starts at 502 in which the global version server receives an updated version history from a client at a host in the network. The global version server receives at 502 the updated version history sent by a client at 408 in FIG. 4. As previously discussed in relation to 408 of FIG. 4, the updated version history received at 502 may be the updated local version history at a host or a portion thereof. Alternatively, the updated version history may be the updated individual version history associated with the file of a new version. At 504, the received updated version history is utilized by the global version server to update the global version history. If the updated version history received at 502 is the updated local version history of a host or a portion thereof, the changes in the local version history from the previous update from the host need only be considered by the global version server to update the global version history at 504. The changes in the local version history from the previous update may be found by determining the versions that have not been ratified (ratification is described in further detail in "Storage- and Transport-Independent Collaborative Document-Management System," which was previously incorporated by reference.

As previously explained, the global version history is updated by matching the VIDs of a new version and the predecessor versions in the individual version history associated with the file of the new version to the VIDs of versions already recorded in the global version history. If a match is found at 504, the existence of the new version is recorded in the global version history with respect to its relationship to one or more other versions already recorded in the global version history. If the individual version history of the new version does not contain any predecessor VIDs, the global version server records the new version as an original version that is not related to any other version in the global version history. If the individual version history of the new version contains one or more predecessor VIDs that did not find matches in 504, the global version server may infer the lineage of the new version with respect to the predecessor versions and record the entire lineage as determined from the individual version history into the global version history. Upon updating the global version history, the global version server sends to interested clients in the network the updated global version history or a portion thereof at 506. For example, the global version server may send part or all of the version history associated with a document of which a newer version has been created to one or more hosts in the network. Process 500 ends with 506.

Updates in the global version history may be communicated to interested or potentially interested hosts in the network in a plurality of manners at 506 in FIG. 5. In some embodiments, if a newer version of a document is added into the global version history, the global version server may send a copy and/or notification of the existence of the newer version to one or more hosts in the network, e.g., to hosts that contain older versions of the document. In some embodiments, the global version server only sends a copy and/or notification of the existence of a newer version to hosts in the network that have at least the latest version of the document prior to the creation of the newer version. In alternative embodiments, the global version server sends information about the existence of a new version to all hosts in the network, and the clients at the hosts determine whether the information is relevant to the host and whether more information of the newer version, a copy of the newer version, etc., is desirable. Updates in the global version history may be communicated by the global version server in real time as updates in the global version history are made or periodically in batches. In other embodiments, clients that exist within private networks contact the global version server periodically to obtain the most recent updates to the global version history.

The notification of the existence of a new version may be provided by the global version server in one or more manners in various embodiments. In some embodiments, the notifications are alerts that explicitly inform the user of a host of the existence of a newer version. Such alerts may take the form of an email, a pop-up message or window, etc. An email or pop-up message or window may include a copy of the newer version and/or a link to the newer version. Alternatively, the notifications by the global version server may be communicated directly to the clients on hosts so that the local version history is updated but the user may not be made aware of the change of status of one or more documents until the user expresses an interest in an affected document, e.g., when a user opens and/or edits a related document. A notification may include an announcement of the existence of the new version and its relation to other related versions in the global version history, the location(s) and/or email(s) of the host(s) at which the new version is stored within the network, one or more links to the new version, etc., as well as statistics associated with the new version, such as author, time of creation, size, etc.

Figure 6:
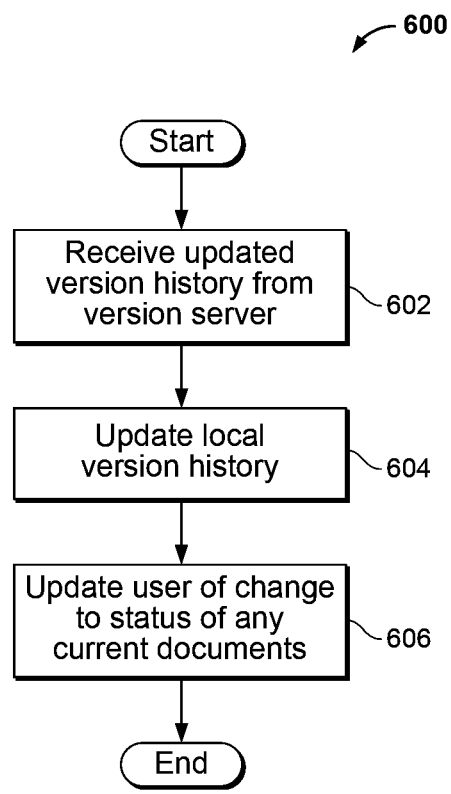
FIG. 6 illustrates an embodiment of a process that the client component of a document management system at a host may perform upon receiving an update from the global version server.

FIG. 6 illustrates an embodiment of a process that the client component of a document management system at a host may perform upon receiving an update from the global version server. Process 600 starts at 602 in which the client receives an updated version history from the global version server. The client receives at 602 the updated version history sent by the global version server at 506 in FIG. 5. As described above, the update in the global version history may be communicated by the global version server to the clients in one or more manners, such as by sending a copy of the newer version, a notification and/or alert of the newer version, changes in the updated global version history, etc. Upon receiving information of the updated global version history at 602, the client updates the local version history at the host at 604. As already discussed, the local version history can be updated in one or more manners depending on what information is received from the global version server. For example, if information about the VID, predecessor VIDs, and/or document identifier is made available to the client, the client can match the newer version to related versions recorded in the local version history. In some embodiments, since the global version server performs version matching when updating the global version history, the global version server may communicate the relevant changes in the global version history to the client so that the client does not have to perform matching.

At 606 of FIG. 6, the user of the host is updated of the change in status of any of the current documents by the client component of the document management system. The user may be updated of any changes in the local version history in real time. For instance, any change in the local version history may be immediately communicated to a user by issuing an alert, e.g., via a pop-up window, message, etc. In some embodiments, a batch of one or more changes in the local version history is periodically communicated to the user so that the user is not interrupted each instance the local version history is updated. In alternative embodiments, any change in the local version history is communicated to the user only when the user expresses an interest in an affected version, e.g., by opening and/or editing a related document. If the local version history is available to a user as a graphical display and/or interface, updates or changes in the local version history may be communicated to a user by visual means, e.g., by a different appearance, color, etc. Process 600 ends with 606.

Access to any version recorded in the global version history may be provided in a plurality of manners. In some embodiments, the global version server provides centralized storage and/or backup storage for all documents and versions distributively stored within the network. In such instances, the global version server is able to directly provide a copy of any version recorded in the global version history to a host. Since the global version server records the location(s) in the network at which each version recorded in the global version history is stored, the global version server can obtain a copy of the desired version from the host on which the version is stored and transmit the copy to the requesting host for the case of distributed storage. Such a situation in which the global version server obtains a newer version from one host and transmits it to another host was depicted and discussed in relation to FIG. 1. In some embodiments, the client may obtain a desired document or version directly from the host on which it is stored if the client has information about the location of the desired document or version. Such peer to peer communication is possible even if the client does not have information about the location of a desired document or version since the client may determine the location at which it is stored from the global version server. The host requesting a document or version may be required to obtain authorization, e.g., from the global version server, current user, author, etc., before access is granted. In some embodiments, authorization is included within a document or version or within metadata attached to the file associated with a version. Alternatively, authorization may be determined from an access-control list embedded in a document or version. In some embodiments, the global version server does not store either files or locations of files; only clients do so. This is preferable if the contents and locations of certain files are sensitive and should not be shared among all parties who use the system.

In some embodiments, a link is provided to a user at a host to facilitate access to a version. For example, the link may be a part of the notification and/or alert initiated by the global version server or the client component at a host to announce the existence of a new version to a user. Clicking on a link could produce various results. In some embodiments, clicking on a link could facilitate the acquisition of a desired version, e.g., from the global version server if the desired version is stored there, from global version server mediated instruction to another host in the network, directly from another host, etc. In one example, if the desired version is locally stored at a host in the network, clicking on a link could provide an instruction to the host at which the desired version is stored to send a copy of the desired version to the requesting host. The instruction may be in the form of an email. Transmittal of the desired version to the requesting host may require the approval of the current user, author, etc., of the desired version. In some embodiments, the instruction is transmitted to the client on the host at which the desired version is stored, and the client transmits a copy of the desired version to the requesting host without user intervention or authorization. The instruction may be mediated by the global version server, and authorization, for example, from the global version server, the current user, the author of the desired version, etc., may be required before the desired version is transmitted to the requesting host.

The client component of the document management system conducts document management operations at a host at all times. The client may issue alerts and notifications to a user of a host, e.g., to announce the existence of a newer or related version. For example, if a user opens a version and a newer version of the document exists either at the host or elsewhere in the network, the client issues an alert to notify the user of the existence of a newer version. In some embodiments, the client presents the local version history to a user of the host as a graphical display and/or interface that depicts the various versions and the relationships among versions. For example, the local version history may be presented to a user as a graphical interface in which the icons representing the various versions are links to the actual versions. If a version is locally stored at a host, clicking on such a link results in the retrieval of the desired version for the user by the client. If a version is not locally stored at a host, clicking on the link for such a version may result in the client acquiring the version from a host in the network on which the desired version is stored in a manner similar to that discussed above. The global version history or a portion thereof may also be available to users in the network as a graphical display and/or interface that depicts the various versions and the relationships among the versions in the network.

In order to perform document management processes at a host, the client component of the document management system may periodically request relevant information from the global version server, e.g., the latest version of a document, the location of one or more versions, the emails of current users of one or more versions, etc. For instance, the host may autonomously request copies of one or more versions from the global version server, e.g., if related versions already exist at the host, if the user at the host expresses an interest in a related version, etc. Of course, the client provides such services upon user initiation. In addition to notifying the global version server of updates in the local version history either in real time or periodically in a batch mode, the client may also periodically query the global version server of the status of all documents stored at a host, the status of documents that are currently in use at the host, updates in the global version history, etc. Thus, the interaction between the clients at the hosts and the global version server is bidirectional, with both attempting to maintain the most current version history at their respective locations and proactively tracking changes in the network.

As discussed herein, document management in a network may be facilitated by a central global version server and client components of the document management system installed on individual hosts in the network. The use of unique version identifiers to identify each version in a network and the attachment of a predecessor version history to each version enables the distributed storage of documents with centralized version control. Version relationships are determined by matching predecessor versions identifiers with the version identifiers of versions recorded in a local and/or global version history.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing documents comprising:
   determining that a first version exists at a first host;
   determining that a second version having a predecessor version identifier exists at a second host;
   determining from the predecessor version identifier that the second version is related to the first version; and
   updating a version history to reflect the determined relationship between the first version and the second version;
   wherein each version, including the first version and the second version, comprises an independent file that includes data comprising that version as well as an individual version history that is persisted with the file comprising a version identifier for that version as well as any applicable predecessor version identifiers associated with related predecessor versions; and
   wherein each host, including the first host and the second host, comprises a node in a network in which one or more document versions, including the first version and the second version, are distributively stored.

2. A method as recited in claim 1 wherein determining that the second version is related to the first version comprises matching the predecessor version identifier with a version identifier assigned to the first version.

3. A method as recited in claim 1 wherein the updated version history comprises a local version history at the first host.

4. A method as recited in claim 1 wherein the updated version history comprises a global version history at a device that maintains the version history of versions created in the network.

5. A method as recited in claim 1 further comprising merging the first version with the second version.

6. A method as recited in claim 1 further comprising providing the first version and the second version to a user for merging.

7. A method as recited in claim 1 further comprising notifying a user of the first version of the existence of the second version.

8. A method as recited in claim 1 further comprising providing access to the second version.

9. A method as recited in claim 1 further comprising providing a link to the second version.

10. A method as recited in claim 1 further comprising notifying a user of the first version of the existence of the second version upon an expression of interest by the user and without otherwise interrupting the user.

11. A method as recited in claim 1 further comprising providing an instruction to the second host to send the second version to the first host.

12. A method as recited in claim 1 wherein the second version has a plurality of predecessor version identifiers.

13. A method as recited in claim 1 wherein the first version has a plurality of predecessor version identifiers.

14. A method as recited in claim 1 wherein the second version has a plurality of predecessor version identifiers and wherein determining that the second version is related to the first version comprises matching one of the plurality of predecessor version identifiers with a version identifier assigned to the first version.

15. A method as recited in claim 1 wherein the predecessor version identifier is persistently associated with the second version.

16. A method as recited in claim 1 wherein the first version has a first version document identifier and the second version has a second version document identifier.

17. A method as recited in claim 16 wherein determining that the second version is related to the first version comprises:
   determining that the first version document identifier is related to the second version document identifier; and
   matching the predecessor version identifier with a version identifier assigned to the first version.

18. A method as recited in claim 16 wherein determining that the second version is related to the first version comprises:
   determining that the first version document identifier is the same as the second version document identifier; and
   matching the predecessor version identifier with a version identifier assigned to the first version.

19. A method as recited in claim 1 further comprising determining that a user of the first version is authorized to access the second version.

20. A method as recited in claim 19 wherein the user is authorized by a server.

21. A method as recited in claim 19 wherein the user is a first user and wherein the first user is authorized by a second user.

22. A method as recited in claim 19 wherein the user is authorized by an access-control list embedded in the second version.

23. A method as recited in claim 1 wherein the first version has a plurality of first version predecessor version identifiers, the second version has a plurality of second version predecessor version identifiers, and determining that the second version is related to the first version comprises verifying that at least one first version predecessor version identifier is the same as at least one second version predecessor version identifier.

24. A method as recited in claim 1 wherein determining that the second version exists comprises receiving a copy of the second version at the first host.

25. A method as recited in claim 1 wherein each host maintains a local version history of the relationships of one or more document versions stored at that host.

26. A system for managing documents comprising:
a memory for storing a version history of documents; and
a processor configured to:
determine that a first version exists at a first host;
determine that a second version having a predecessor version identifier exists at a second host;
determine from the predecessor version identifier that the second version is related to the first version; and
update the version history to reflect the determined relationship between the first version and the second version;
wherein each version, including the first version and the second version, comprises an independent file that includes data comprising that version as well as an individual version history that is persisted with the file comprising a version identifier for that version as well as any applicable predecessor version identifiers associated with related predecessor versions; and
wherein each host, including the first host and the second host, comprises a node in a network in which one or more document versions, including the first version and the second version, are distributively stored.

27. A system as recited in claim 26 wherein the updated version history comprises a local version history at the first host.

28. A system as recited in claim 26 wherein the updated version history comprises a global version history at a device that maintains the version history of versions created in the network.

29. A system as recited in claim 26 wherein the second version has a plurality of predecessor version identifiers and wherein determining that the second version is related to the first version comprises matching one of the plurality of predecessor version identifiers with a version identifier assigned to the first version.

30. A system as recited in claim 26 wherein the first version has a plurality of first version predecessor version identifiers, the second version has a plurality of second version predecessor version identifiers, and determining that the second version is related to the first version comprises verifying that at least one first version predecessor version identifier is the same as at least one second version predecessor version identifier.

31. A system as recited in claim 26 wherein determining that the second version exists comprises receiving a copy of the second version at the first host.

32. A system as recited in claim 26 wherein each host maintains a local version history of the relationships of one or more document versions stored at that host.

33. A computer program product for managing documents, the computer program product being embodied in a non-transitory computer readable storage medium and comprising computer instructions for:
determining that a first version exists at a first host;
determining that a second version having a predecessor version identifier exists at a second host;
determining from the predecessor version identifier that the second version is related to the first version; and
updating a version history to reflect the determined relationship between the first version and the second version;
wherein each version, including the first version and the second version, comprises an independent file that includes data comprising that version as well as an individual version history that is persisted with the file comprising a version identifier for that version as well as any applicable predecessor version identifiers associated with related predecessor versions; and
wherein each host, including the first host and the second host, comprises a node in a network in which one or more document versions, including the first version and the second version, are distributively stored.

34. A computer program product as recited in claim 33 wherein the updated version history comprises a local version history at the first host.

35. A computer program product as recited in claim 33 wherein the updated version history comprises a global version history at a device that maintains the version history of versions created in the network.

36. A computer program product as recited in claim 33 wherein the second version has a plurality of predecessor version identifiers and wherein determining that the second version is related to the first version comprises matching one of the plurality of predecessor version identifiers with a version identifier assigned to the first version.

37. A computer program product as recited in claim 33 wherein the first version has a plurality of first version predecessor version identifiers, the second version has a plurality of second version predecessor version identifiers, and determining that the second version is related to the first version comprises verifying that at least one first version predecessor version identifier is the same as at least one second version predecessor version identifier.

38. A computer program product as recited in claim 33 wherein determining that the second version exists comprises receiving a copy of the second version at the first host.

39. A computer program product as recited in claim 33 wherein each host maintains a local version history of the relationships of one or more document versions stored at that host.

* * * * *